United States Patent [19]

Roberts et al.

[11] Patent Number: 4,714,912

[45] Date of Patent: Dec. 22, 1987

[54] SINGLE-CONDUCTOR POWER LINE COMMUNICATIONS SYSTEM

[75] Inventors: Victor D. Roberts, Burnt Hills; Joseph C. Borowiec, Schenectady, both of N.Y.

[73] Assignee: General Electric Company, Schenectady, N.Y.

[21] Appl. No.: 948,180

[22] Filed: Dec. 31, 1986

[51] Int. Cl.$^4$ .............................................. H04M 11/04
[52] U.S. Cl. ............................ 340/310 R; 340/310 A; 375/37
[58] Field of Search ........ 340/310 R, 310 A, 310 CP, 340/538; 375/37, 38, 36

[56] References Cited

U.S. PATENT DOCUMENTS

| | | | |
|---|---|---|---|
| 4,520,488 | 5/1985 | Houvig et al. | 340/310 R |
| 4,636,771 | 1/1987 | Ochs | 340/310 R |
| 4,668,934 | 5/1987 | Shuey | 340/310 A |

Primary Examiner—Donnie L. Crosland
Attorney, Agent, or Firm—Geoffrey H. Krauss; James C. Davis, Jr.; Marvin Snyder

[57] ABSTRACT

A power line communications (PLC) system utilizes a single conductor of a multiple-conductor power-transmission circuit, for carrying signal current, injected by at least one transmitter in series with that single conductor, to at least one receiver also coupled to that power line circuit. Each transmitter includes a saturable AC coupler connecting a switch to the conductor, while providing DC isolation therebetween. Each transmitter provides a signaling current having a frequency at least two orders of magnitude greater than the power line frequency, during at least some portion of each power line waveform signal cycle when the coupler is not saturated. Each transmitter preferably includes a power supply for providing transmitter operating potential responsive to the load current carried in that single conductor utilized for system signaling.

19 Claims, 3 Drawing Figures

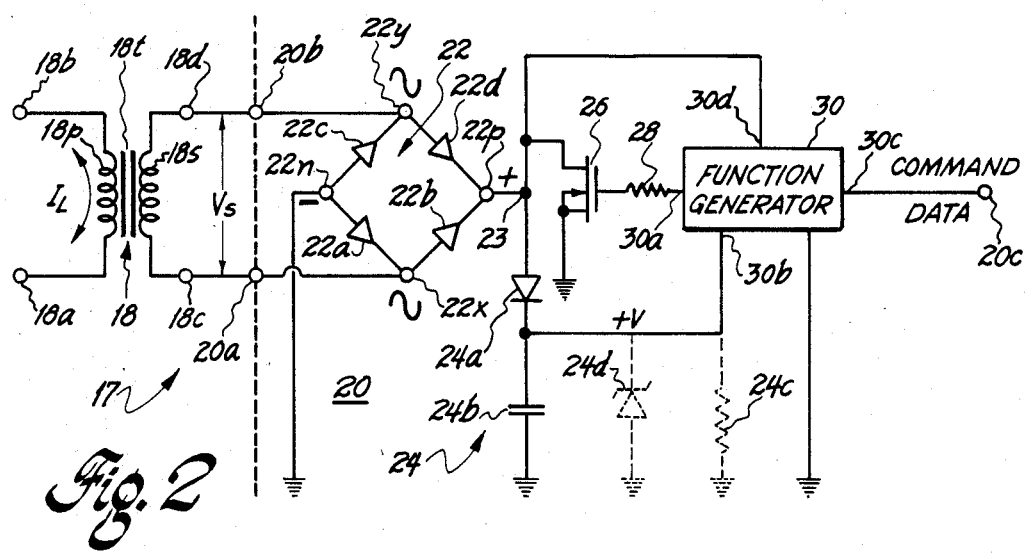
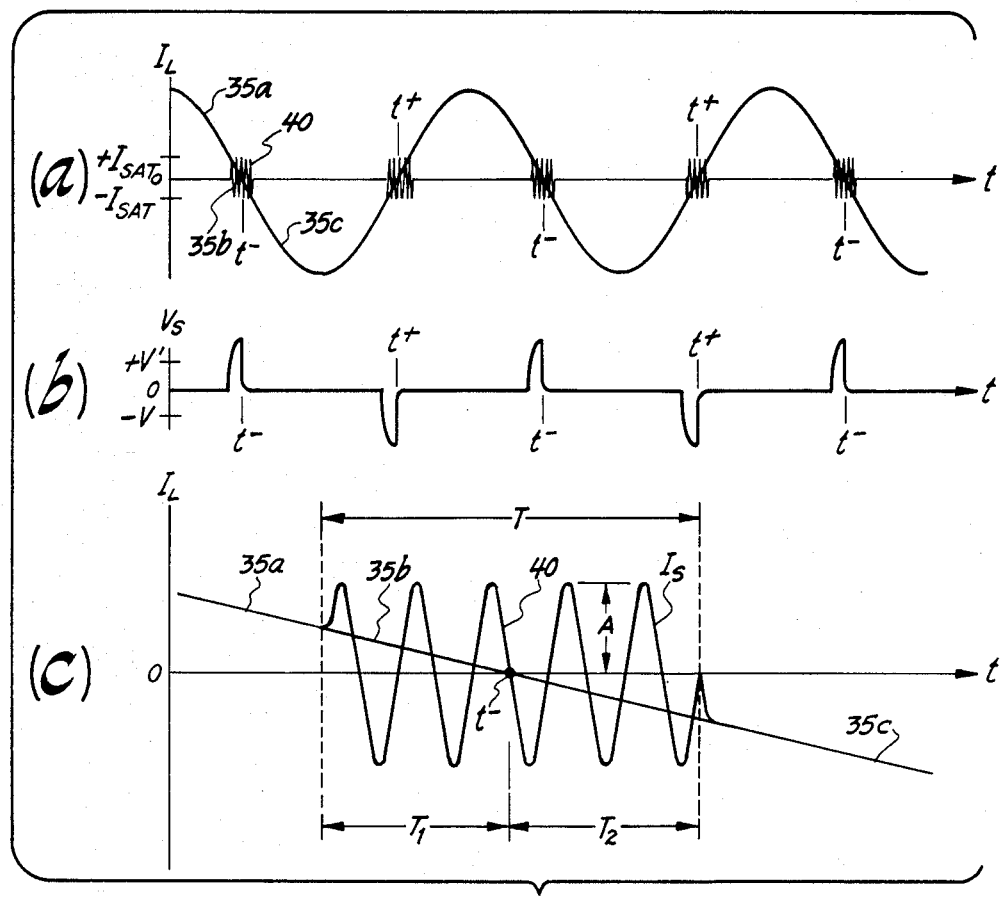

SINGLE-CONDUCTOR POWER LINE COMMUNICATIONS SYSTEM

The present invention relates to information communications over a power line, and more particularly, to a power line communication system in which only a single conductor, of a pair of branch line conductors, is available for both providing operating power to, and carrying communication signals between, at least one system transmitter and at least one system receiver.

It is often desirable to provide an electrical device, receiving operating energy from a power line circuit, with control information also communicated over the same power line. The communicated control signals can be simple ON/OFF, or more complex, command signals and can be utilized for any known purpose, such as to: vary motor speed; dim lamps; time initiation, sequence and termination of appliance operation; and the like. It is well known to connect a dedicated electrical or optical signal distribution system between each of at least one controlling points and each of at least one controlled devices, although such a system is generally more expensive than a system which impresses the control signals onto the power line conductors; in the latter case, the control signal usually takes the form of a carrier signal at a frequency much higher than the power line frequency (60 Hz. in the United States). While it is well known that high frequency control signal voltages can be impressed upon a power line when both the "hot" and the "neutral" current-carrying conductors are available at at least each transmitter point, these "two-conductor" power line communications (PLC) systems are generally not useful in those power distribution systems, such as might be found in a residential or small business building, where only the "hot" power lead is available for connection to the controlling device. A typical application might be the installation of a control system transmitter at a wall switch box which contains neither the neutral conductor nor a good building ground. It is therefore highly desirable to provide a single-conductor power line communication system which not only obtains all of its operating power from the single readily-available current-carrying conductor, but which also utilizes the same single conductor for transmission of PLC control signals to control reception devices connected to the power line.

BRIEF SUMMARY OF THE INVENTION

In accordance with the invention, a power line communications (PLC) system utilizes a single conductor of a multiple-conductor power-transmission circuit, to carry signal current injected by at least one transmitter in series with that single conductor, to at least one reception means coupled to that power line circuit. Each transmitter includes a saturable means for AC coupling a switching means to the single circuit conductor, while providing DC isolation therebetween; and a transmitter means for providing a signaling current, having a frequency at least two orders of magnitude greater than the power line frequency, in the single power line circuit conductor during at least some portion of each power line signal waveform cycle when the coupling means is not saturated. Each transmitter means preferably includes power supply means for providing operating potential to the transmitter, responsive to potential realized from the load current carried in the single conductor utilized for system signaling.

In a presently preferred embodiment, each coupling/isolation means is a saturable core current transformer, and each transmitter means comprises a switchable semiconductor, such as a field-effect transistor, connected between opposite terminals of a bridge rectifier which has the remaining juxtaposed terminals connected across the coupling transformer secondary winding.

Accordingly, it is an object of the present invention to provide a single-conductor power line communications system.

This and other objects of the present invention will become apparent upon reading of the following detailed description, when considered in conjunction with the drawings.

BRIEF DESCRIPTION OF THE DRAWINGS

FIG. 2 is a schematic diagram of a presently preferred embodiment of transmitter, including the coupling and isolation means, and transmitter means, for use in the system of FIG. 1-9; and FIG. 3 is a set of graphs illustrating the various current and voltage signal waveforms present at various points in the transmitter of FIG. 2, and useful in understanding principles of operation thereof.

DETAILED DESCRIPTION OF THE INVENTION

Figure 1:
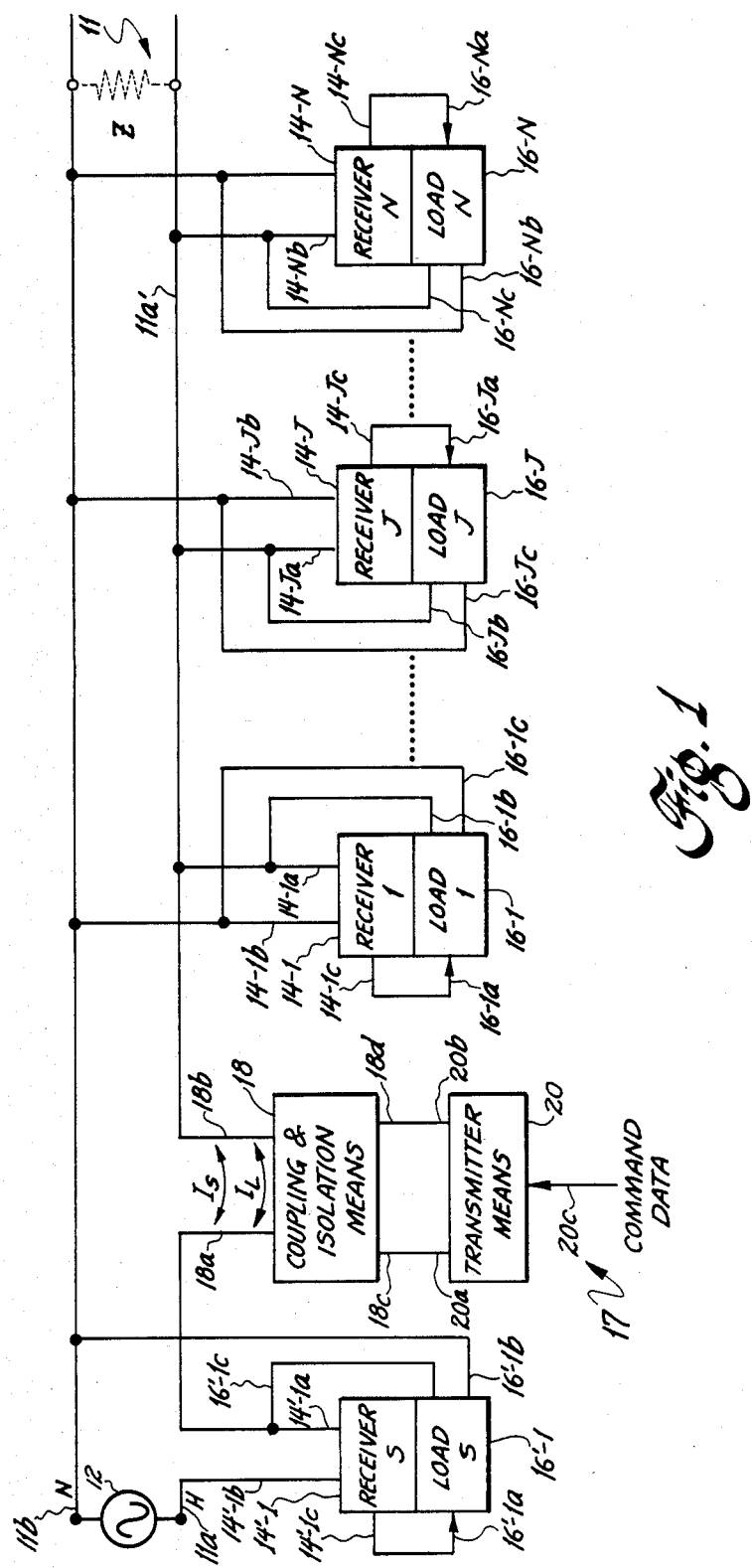
FIG. 1 is a schematic block diagram of a branch power line and of a single-conductor power line communications system utilized therewith, in accordance with the principles of the present invention.

Referring initially to FIG. 1, a power line communications (PLC) system 10 operates in conjunction with a power distribution circuit 11 having a hot H conductor 11a and a neutral N conductor 11b, each connected to an opposite side of a AC source 12, for coupling operating energy from source 12 to loads coupled between conductors 11a and 11b. A system-wide common ground conductor is not shown, for purposes of simplicity. Some of these loads (not shown) are non-controllable and continuously coupled between the pair of conductors, or are manually coupleable to, and decoupleable from, the conductors in well known manner; the power line communication system is concerned with such loads only to the extent that operating energy is to be provided to such loads as if the PLC system is essentially "transparent", i.e. essentially not present. System 10 comprises at least one PLC receiver (generally denoted as means 14) receiving communicated intelligence signals via inputs (generally denoted as inputs 14a and 14b) connected to the power line 11, and providing recovered data at a data output (generally denoted as output 14c), in manner well known to the art. Associated with each receiver 14 is a load (generally denoted means 16) having a control input (generally denoted as input 16a) for controlling connection and/or operation of that load to power line conductor extensions (generally denoted as inputs 16b and 16c), also in manner well known to the art. Illustratively, each respective one of a plurality N of receivers 14-1, ..., 14-J, ..., 14-N has a respective first power line input 14-1a, ..., 14-Ja, ..., 14-Na connected to the hot power line H conductor 11a and has a respective second power line input 14-1b, ..., 14-Jb, ..., 14-Nb connected to the neutral power line circuit conductor 11b. These inputs provide both operating power and input of communication signals. Each respective one of receiver means 14-1, ..., 14-J, ..., 14-N has a respective data output 14-1c, ..., 14-Jc, ..., 14-Nc at which recovered data is provided, at the location of that respective receiver, to the associated one respective data input 16-1a, ..., 16-Ja, ..., 16-Na of at least one associated load 16-1, ..., 16-J, ..., 16-N. Each load receives AC power by connection of its respective AC input connections 16-1b/16-1c, ..., 16-Jb/16-Jc, ..., 16-Nb/16-Nc to the power line H/N conductors 11a/11b.

The communicated information is in the form of a current $I_S$ which appears, responsive to a transmitter 17 connected in series with one of the pair of conductors. Preferably, transmitter 17 is connected in series with H conductor 11a. At least one load, which can be either a system load 16 capable of being remotely controlled or one of the continuously-connected loads or manually-connected loads (the latter two types of loads being shown, in broken line, only as a parallel impedance Z), must be present between the Neutral conductor 11b and that portion 11a' of the Hot conductor existing "downstream" from, i.e. upon the other side of, transmitter 17, with respect to source 12, such that communications signal currents $I_S$ which are injected into the downstream conductor portion 11a' will cause a signal voltage to appear effectively in parallel across the downstream total impedance Z. The developed signal voltage will be receivable only at parallel-input system receivers downstream of transmitter 17, but will be receivable by all system receivers, including those receivers 14' having a series input, e.g. the S-th receiver 14'-1 with inputs 14'-1a and 14'-1b series-connected with the upstream H conductor portion 11, in addition to the downstrream portion 11a'.

Transmitter 17 includes a coupling and isolation means 18, having one of a pair of primary terminals 18a and 18b at opposite ends of a primary circuit through which at least the circuit 11 load current $I_L$ flows. A secondary circuit appears between a pair of output terminals 18c and 18d. Thus, a communications current from the secondary circuit will appear as a current $I_S$ flow between the "primary" terminals 18a and 18b. The "secondary" terminals 18c and 18d have a high degree of low frequency (i.e. power source frequency) AC and DC isolation from the "primary" terminals; there is a high degree of AC coupling at the PLC control signal frequency (preferably at least two orders of magnitudes greater than the (60 Hz) power source frequency, i.e. at more than 6 KHz.). The coupling means secondary terminals 18c and 18d are respectively coupled to the respective output terminals 20a and 20b of a transmitter means 20. The particular information-communications signals, typically having a variation in at least one predetermined characteristic of the high frequency signal waveform, is provided by transmitter means 20 responsive to the digital data state of each bit of command data received at a data input 20c, from means not shown but well known to the art. It should be understood that a series-input system receiver 14' could use means 18, and the like, for the PLC signal from the circuit conductor 11 to the receiver and for both coupling the PLC signal from the conductor 11 to the receiver and for isolating the receiver from the powerline at low frequency (60 Hz.) coupling.

Referring now to FIG. 2, a current transformer is used as the coupling and isolation means 18, of transmitter 17, to provide for relatively unattenuated flow of AC load current $I_L$ between its primary terminal 18a and 18b and to also couple a relatively high frequency signal current from its secondary terminals 18c and 18d to primary terminals 18a and 18b. The transformer has an easily saturatable core 18t, upon which is wound a primary winding 18p, connected between primary terminals 18a and 18b, and a secondary winding 18s, connected between secondary terminals 18c and 18d. The primary winding generally has fewer turns than the secondary winding. The small magnetic transformer core 18t is so selected (for cross-sectional area and saturation flux density) so that, with the selected number of primary turns, secondary turns and secondary load impedance, the core saturates at some primary current flow value less than a preselected minimum power line load current $I_L$ flow; the core is generally saturated during a majority of the source 12 power signal cycle. In a test circuit, where a single 40 watt incandescent lamp was used as the entire downstream fixed load Z, the primary winding has 60 turns of #30 wire, which is tightly coupled to the core. Illustratively, the core was an Indiana General F627-8, of type 0-6 material, with a cross-sectional area of about 0.047 in.$^2$, a saturation flux density of about 4700 Gauss and an inductance factor $A_L$ of about 1850 mhy./1000 turns. With a secondary winding 18s of about 160 turns, transformer 18 has a primary inductance of about 9 mhy., a primary resistance of about 0.8 ohms, and an A.C. impedance of about 3.3 ohms at 60 Hz. The saturation voltage of about 0.23 V rms is very much less than (i.e., about 0.2% of) the 115 V rms source potential.

Transmitter means 20 operates by injecting a signal current $I_S$ in the primary winding by placing across the secondary winding a selected one of a very low impedance and a very high impedance. The low impedance state causes a primary winding signal current flow of magnitude responsive to the turns ratio, secondary voltage and secondary impedance values. The high impedance state allows a small voltage to be present across the secondary winding, for possible use in energizing the transmitter means 20 by a power supply means (to be described hereinbelow).

One preferably preferred embodiment of transmitter means 20 includes a diode bridge 22, having the juxtaposed AC inputs terminals thereof (i.e. a terminal 22x, between diodes 22a and 22b and a terminal 22y, between diodes 22c and 22d) respectively connected to respective terminals 20a and 20b, and thence respectively connected to respective coupling means secondary terminals 18c and 18d. A "negative" bridge terminal 22n, between diodes 22a and 22c, is connected to a transmitter means common potential, while a bridge means "positive" terminal 22p, between diodes 22d and 22b, is connected to a node 23. In the transmitter means "off", or high impedance, state, the fullwave-rectified power line signal at node 23 is applied to a transmitter means power supply circuit 24 to provide operating potential +V for the transmitter. Power supply circuit 24 may typically include a unilaterally-conducting element 24a, such as a diode and the like, and a charge storage element 24b, such as a capacitor and the like, to provide a substantially DC potential across the equivalent load resistance 24c of the transmitter. A voltage stabilizing element 24d, such as zener diode and the like, may be further utilized, if required. Unidirectionally-conducting element 24a is used to prevent the removal of charge from storage capacitor 24b when a switching device 26, such as a field-effect transistor (FET) and the like, is "closed" to provide a low impedance connection between the bridge +terminal 22p and the bridge −terminal 22n, and thus provide the transmitter "on" state. Because the isolation means is saturated for a larger portion of the source cycle, a relatively small voltage appears across device 26, which need not have to withstand the full potential of source 12. Switching element 26 has its controlled-current circuit (e.g. the drain-source circuit of FET 26) controlled by a signal at a control electrode (e.g. the gate electrode of the illustrated FET), which is provided via a series limiting element, such as a resistor 28, from the signal at an output 30a of a function generator means 30. The generator means, which may be of handwired logic or programmable microcomputer form, receives operating potential +V, from power supply circuit 24, at an operating potential input 30b. One of the signal characteristics (amplitude, frequency, phase and the like) of the signal at output 30a is varied responsive to each of the at least two digital data states at a data input 30c of the function generator; this data is provided from transmitter means input 20c.

Referring to FIGS. 2 and 3, operation of transmitter 17, for generation of a relatively high frequency PLC information-communications signal across impedance Z, and thus in parallel at each of the receivers in system 10, is as follows: assume initially that, responsive to a first data state at command data input 20c, the switching device 26 is in the "off" condition. As the load current $I_L$ (curve a of FIG. 3) is reduced until the isolation means core comes out of saturation, e.g. the load current is decreased from a positive-polarity portion 35a into an unsaturated portion 35b (which may be substantially centered about each source waveform zero crossing, e.g. the negative-going crossing at time $t^-$) the secondary voltage $V_s$ signal (waveform b of FIG. 3) changes from zero to a peak value V', where V' is greater than V. The isolation means core again saturates when the load current, now in the negative polarity portion 35c, exceeds the saturation current $-I'_{sat}$; the negative-polarity saturation current magnitude $|I'_{sat}|$ is usually, but need not always be, equal to the positive-polarity saturation current magnitude $|I'_{sat}|$. Thus, a first polarity secondary winding voltage pulse is present at every negative-going zero crossing $t^-$, while an opposite polarity secondary winding voltage pulse is present at every positive-going zero crossing $t^+$. The dual-polarity pulses are, when switching means 26 is in the "off" condition, full wave rectified and applied to node 23; these positive-polarity pulses, at twice the source waveform frequency, are utilized by the power supply portion 24 to provide the operating potential +V required by transmitter means 20.

Responsive to a second data state, different from the first data state, received at command data input terminal 20c, function generator 30 provides a high frequency periodic waveform at output 30a. Illustratively, this waveform can be a substantially square waveform at a frequency $F_s$ of about 125 Khz. The amplitude of the function generator output 30a signal is sufficient to switch device 26 at a frequency well above the power line supply frequency; the alternating open and closed switching means conditions across the bridge rectifier means 22 respectively provides alternating respective high impedance and low impedance conditions across the coupling means secondary winding. The effect, on the primary side current, is only present during the time interval T when the load current $I_L$ is of sufficiently low amplitude to remove the coupling means from saturation (expanded time-scale waveform c of FIG. 3). Because the magnetic field will not instantaneously fall to a zero magnitude, even if the load current falls to zero magnitude at the zero crossing, a sufficiently large amplitude A of signal current $I_s$ can be generated, and maintained even at the zero crossing point, to provide a burst of high frequency signal 40. Although the coupling transformer could be designed such that the magnetic field falls to zero as the current reaches zero, if desired, the use of non-simultaneous zero conditions allows the signaling current to appear as a substantially constant amplitude burst. The pre-zero time interval $T_1$ may, but need not, be essentially equal to the post-zero time interval $T_2$, i.e. the positive and negative saturation currents $I_{sat}$ and $I'_{sat}$ need not be exactly equal. In fact, the function generator 30 not only could be synchronized with the phase, zero crossing or other source 12 waveform information (as by connection of node 23, or any other point in the transmitter circuit, to a synchronization input 30d of the function generator), but could also be so designed as to further encode the same, or additional, information by pulse width modulation (PWM) and the like of the signaling current 40 time interval(s). In the illustrated embodiment, however, the function generator provides the square wave switch-driving waveform continuously during the presence of the second data condition at input 20c, although the saturation of the coupling transformer core renders the transmitter means invisible while the core is in saturation, so that the high frequency signaling waveform 40 is only provided during intervals of core non-saturation, when the core has not "disappeared" from the circuit. The resulting signaling current $I_s$ is relatively small, e.g. about 10 mA (rms), but is still sufficient to provide about 0.5 V (rms). This signal current/voltage is more than sufficient for reception at each of receivers 14 and/or 14', for control use, e.g. for comparison against the assigned code number of that receiver, for providing data for energization and de-energization of the associated loads, if the assigned code number criteria is met, and so forth. It will be seen that, while our system will not operate in the total absence of some load current $I_L$ flow, when some load current is present only loads intended for PLC control will react to the relatively low amplitude PLC signal 40, and non-PLC-controllable loads will essentially ignore the PLC control signal.

While one presently preferred embodiment of our novel single-conductor power line communications system has been described herein, many variations and modifications will now become apparent to those skilled in the art. It is our intent, therefore, to be limited only by the scope of the appended claims and not by the specific details and instrumentalities provided by way of explanation of the preferred embodiment herein.

What is claimed is:

1. A system for communicating digital information on a power line circuit having a plurality of conductors interconnecting at least one AC power source and at least one power-consuming load, comprising:
    at least one means, coupled to at least one of the conductors, for receiving a PLC signal and for controlling at least one controlled-power-consumption load responsive to the information received; and
    at least one transmitter for forming the PLC signal by injection of a PLC signal current in series with only a single one of the power line conductors, and comprising: input means for receiving digital information to be transmitted; generator means for providing an output signal with (1) cyclic alternation between first and second states at a PLC frequency, at least two orders of magnitude greater than the AC source frequency, responsive to a first condition of the digital information at said input means, and (2) another selection of at least the second state, responsive to a second condition of the digital information at said input means; switching means for providing a controllable impedance with respective low impedance and high impedance states responsive to respective first and second states of said output signal; and saturable means for effectively coupling the switching means to the single conductor for injecting the PLC signal current therein only when the current in the single conductor is not greater than a saturation current level.

2. The system of claim 1, wherein the generator means output signal continuously contains only the second state responsive to the second input means condition.

3. The system of claim 1, wherein the coupling means also provides DC isolation between the switching means and the single conductor.

4. The system of claim 1, wherein each transmitter further comprises power supply means for providing at least one operating potential responsive to the flow of current in the single conductor.

5. The system of claim 1, wherein each transmitter further includes means for synchronizing the generator means output signal to a preselected characteristic of the AC source signal.

6. The system of claim 1, wherein the coupling means comprises a current transformer having a primary winding connectable in series with the single conductor, a magnetic core configured for magnetic saturation responsive to a preselected saturation current flowing in the primary winding, and a secondary winding effectively coupled to the primary winding through the core only when the core is not saturated.

7. The system of claim 6, wherein the number of turns of the primary winding is less than the number of turns of the secondary winding.

8. The system of claim 6, wherein the characteristics of said core are selected for saturation with a predetermined secondary winding voltage less than the source voltage.

9. The system of claim 8, wherein the transmitter further comprises power supply means for providing at least one operating potential responsive to the flow of current in the single conductor, and the transformer saturation parameters are selected to cause the power supply means to provide a predetermined potential magnitude.

10. The system of claim 6, wherein the transformer core is saturated for substantially equal magnitudes of current flowing in either direction in the single conductor.

11. The system of claim 1, wherein the switching means includes a control terminal receiving the generator output signal, and a controlled-conduction circuit across which is provided the controlled impedance, responsive to the state of the signal at the control terminal.

12. The system of claim 11, wherein the switching means is a semiconductor switching device.

13. The system of claim 12, wherein the semiconductor device is a field-effect transistor (FET), having a gate electrode connected to the control terminal and a drain-source circuit providing the controlled impedance.

14. The system of claim 13, wherein the switching means further comprises a bridge rectifier receiving an AC voltage from the coupling means and providing a DC voltage across the FET drain-source circuit.

15. The system of claim 14, wherein the transmitter further comprises power supply means for providing at least one operating potential responsive to the DC voltage across the FET drain-source circuit.

16. The system of claim 1, wherein said generator means cyclic alternation has a substantially square waveform.

17. The system of claim 16, wherein the cyclic alternation occurs at a PLC frequency on the order of 125 KHz.

18. The system of claim 15, wherein the cyclic alternation occurs for a substantially fixed time interval T at each zero crossing of the AC source signal waveform.

19. The system of claim 15, wherein the time interval T is not symmetrically disposed about each zero crossing.

* * * * *